(12) United States Patent
Rikoski

(10) Patent No.: US 11,312,463 B2
(45) Date of Patent: Apr. 26, 2022

(54) SYSTEMS AND METHODS FOR RETRACTABLE MARINE POWER GENERATION

(71) Applicant: Hadal, Inc., Oakland, CA (US)

(72) Inventor: Richard J. Rikoski, Alameda, CA (US)

(73) Assignee: HADAL, INC., Oakland, CA (US)

(\*) Notice: Subject to any disclaimer, the term of this patent is extended or adjusted under 35 U.S.C. 154(b) by 85 days.

(21) Appl. No.: 16/690,976

(22) Filed: Nov. 21, 2019

(65) Prior Publication Data

US 2020/0156753 A1 May 21, 2020

Related U.S. Application Data

(60) Provisional application No. 62/770,457, filed on Nov. 21, 2018.

(51) Int. Cl.
*B63H 21/17* (2006.01)
*H02S 10/40* (2014.01)
(Continued)

(52) U.S. Cl.
CPC ............ *B63H 21/17* (2013.01); *B63B 22/00* (2013.01); *B63B 35/44* (2013.01); *B63G 8/001* (2013.01); *H02S 10/40* (2014.12); *H02S 30/20* (2014.12); *H02S 40/38* (2014.12); *B63B 2035/4453* (2013.01); *B63G 2008/004* (2013.01); *B63H 2021/171* (2013.01)

(58) Field of Classification Search
CPC .. B63H 21/17; B63H 2021/171; B63B 22/00; B63B 35/44; B63B 2035/4453; B63G 8/001; B63G 2008/004; H02S 10/40; H02S 30/20; H02S 40/38
See application file for complete search history.

(56) References Cited

U.S. PATENT DOCUMENTS 9,524,646 B2 \* 12/2016 Hine ............... G08G 3/00
10,250,183 B2 \* 4/2019 Edmunds ............... F24S 25/10
(Continued)

FOREIGN PATENT DOCUMENTS

CN 203937826 11/2014
CN 105109655 12/2015
(Continued)

*Primary Examiner* — S. Joseph Morano
*Assistant Examiner* — Jovon E Hayes
(74) *Attorney, Agent, or Firm* — Burns & Levinson LLP; Christopher Carroll

(57) ABSTRACT

Systems, methods, and apparatuses are described herein for providing electrical power to a marine vehicle. In some aspects, a marine vehicle includes a power system arranged to receive and store electrical power delivered from a solar panel assembly. The power system may include one or more batteries. The vehicle also includes a processor arranged to determine an extension time and an retraction time for a solar panel assembly and a controller that, in response to instructions from the processor, is arranged to extend the solar panel assembly and retract the solar panel assembly. The solar panel assembly is arranged to be configured in at least one of an extended position and a retracted position. The solar panel assembly includes one or more solar panels where the solar panel assembly is in electrical communication with the power system.

17 Claims, 10 Drawing Sheets

(51) Int. Cl.
*H02S 30/20* (2014.01)
*H02S 40/38* (2014.01)
*B63B 22/00* (2006.01)
*B63B 35/44* (2006.01)
*B63G 8/00* (2006.01)

(56) References Cited

U.S. PATENT DOCUMENTS

| | | | | |
|---|---|---|---|---|
| 2010/0229916 A1* | 9/2010 | Bechamp | ............... | F24S 40/20 136/244 |
| 2011/0049992 A1* | 3/2011 | Sant'Anselmo | ........ | H02S 10/12 307/64 |
| 2011/0253614 A1* | 10/2011 | Curran | ............... | H02S 30/20 210/239 |
| 2013/0059488 A1* | 3/2013 | Hine | ............... | F03B 13/10 440/6 |
| 2014/0301161 A1* | 10/2014 | Brizard | ............... | B63G 8/001 367/15 |
| 2014/0345511 A1* | 11/2014 | Rikoski | ............... | B63B 35/40 114/259 |
| 2015/0027339 A1* | 1/2015 | Lamba | ............... | B61C 17/06 105/35 |
| 2015/0162865 A1* | 6/2015 | Cowham | ............... | F24S 25/70 136/251 |
| 2015/0346726 A1* | 12/2015 | Davoodi | ............... | B63G 8/001 701/21 |
| 2017/0267319 A1* | 9/2017 | Morash | ............... | B22D 31/00 |
| 2017/0285203 A1* | 10/2017 | Fyffe | ............... | G01V 1/3852 |
| 2017/0366133 A1* | 12/2017 | Taha | ............... | H02S 20/30 |
| 2018/0320835 A1* | 11/2018 | Poage | ............... | F21S 9/032 |
| 2018/0366955 A1* | 12/2018 | Rikoski | ............... | H02J 7/0024 |
| 2019/0013768 A1* | 1/2019 | Levin | ............... | F24S 10/17 |
| 2019/0128711 A1* | 5/2019 | Connor | ............... | H04W 4/40 |
| 2019/0202530 A1* | 7/2019 | Rikoski | ............... | B64C 39/024 |
| 2020/0156753 A1* | 5/2020 | Rikoski | ............... | H02S 30/20 |
| 2021/0028740 A1* | 1/2021 | Ramos | ............... | H02S 30/20 |
| 2021/0048544 A1* | 2/2021 | Wolfel | ............... | G01V 1/3835 |

FOREIGN PATENT DOCUMENTS

| | | |
|---|---|---|
| CN | 106982025 | 7/2017 |
| CN | 107600370 | 1/2018 |
| CN | 108199647 | 6/2018 |

* cited by examiner

SYSTEMS AND METHODS FOR RETRACTABLE MARINE POWER GENERATION

REFERENCE TO RELATED APPLICATIONS

This application claims priority to and the benefit of U.S. Provisional Patent Application No. 62/770,457, filed on Nov. 21, 2018, and entitled "Systems and Methods for Retractable Marine Power Generation," the entire contents of which are incorporated herein by reference.

FIELD OF THE INVENTION

The invention relates generally to systems and methods for generating electrical power. More particularly, in various aspects, the invention relates to generating electrical power for marine vehicles.

BACKGROUND

The past several decades have seen a steady increase in the number of unmanned marine vehicles, vessels, and/or devices, including unmanned surface ships, buoys, and underwater robotic systems, deployed for use in the ocean. The underwater systems are also referred to as autonomous underwater vehicles (AUVs). Many of these systems are equipped with power systems including batteries to accomplish their respective mission. Existing marine vehicles, however, typically have limited mission periods due to limited power and/or battery capacities, while also being difficult to recharge, especially while deployed in the ocean.

One type of marine vehicle is a buoy, which is a device and/or vehicle configured to float within a body of water such as an ocean. A buoy can perform various objectives including functioning as a sea mark, lifebuoy, a submarine communications buoy, a DAN buoy, navigational buoy, Sonobuoy, surface marker buoy, decompression buoy, shot buoy, weather buoy, Tsunami buoy, wave buoy, and so on. A buoy can be anchored (tethered) or allowed to drift within a body of water. Various techniques are known for deploying buoys. Buoys, along with other marine devices, such as AUVs typically require power for a period of time to perform their functions.

Accordingly, there is a need for systems and mechanisms that enable more robust and efficient energy charging and/or recharging of power systems in marine devices and/or vehicles.

SUMMARY

Systems and methods are described herein for providing electrical power to a marine vehicle via a solar panel assembly capable of being extended and retracted by the marine vehicle depending on sensed conditions and/or timing (e.g., daylight, sea conditions, temperature, time of day, marine traffic, and so on).

In one implementation, a marine vehicle includes a power system arranged to receive and store electrical power delivered from a solar panel assembly. The power system may include one or more batteries. The vehicle also includes a processor arranged to determine an extension time and a retraction time for a solar panel assembly and a controller that, in response to instructions from the processor, is arranged to extend the solar panel assembly and retract the solar panel assembly. The controller may include an electronically actuated motor, an electric motor, pneumatic system, electronically actuated pneumatic motor, a hydraulic system, an electronically actuated hydraulic motor, and/or an electromechanical motor. The solar panel assembly is arranged to be configured in at least one of an extended position and a retracted position. The solar panel assembly is configured to be in the extended position for a first period of time. The solar panel assembly is further configured to be in the retracted position for the second period of time. The first period of time includes a period when sufficient daylight is available for the solar panel assembly to generate electrical power. The second period of time includes a period when there is insufficient daylight available for the solar panel. The solar panel assembly includes one or more solar panels where the solar panel assembly is in electrical communication with the power system.

The marine vehicle may include a solar assembly housing arranged to store the solar panel assembly while in the retracted position. The solar assembly housing may be integrated with a housing of the vehicle or may be included within the housing of the vehicle. The vehicle may be an AUV, an autonomous surface ship or boat, a buoy, a marine platform, a marine oil rig, a submarine, or any like marine apparatus.

In one configuration, one or more solar panels are flexibly bendable. The one or more solar panels may be rolled in the retracted position, while being unrolled in the extended position. Depending on the length of the solar panels, rigid solar panels may be rolled into and out of a housing. The length of the solar panels may be proportional to the circumference of a solar panel assembly housing. The length of one or more solar panels may be less than or equal to about $\frac{1}{3}$, $\frac{1}{4}$, $\frac{1}{8}$, $\frac{1}{10}$, $\frac{1}{20}$, $\frac{1}{50}$, $\frac{1}{100}$ of the circumference of the housing of the solar panels. In another configuration, one or more solar panels are stacked in the retracted position, while being unstacked and/or substantially adjacent to each other in the extended position.

The vehicle may have one or more motion sensors, light sensors, and/or clocks. The processor may determine the extension time (a time when to initiate extension of the solar panel assembly) based on at least one of an input from the motion sensor, the light sensor, and the clock. The processor may determine a retraction time based on at least one of an input from the motion sensor, the light sensor, and the clock. The motion sensor may include an accelerometer. The processor may extend or retract the solar panel assembly based at least on i) comparing a time of the clock with a stored extension time or retraction time stored in a memory, ii) comparing a detected light level, via the light sensor, with a light level stored in the memory, and iii) comparing a detected amount of movement, via the motion sensor, with a movement limit stored in the memory.

A portion of the solar panel assembly may be submersible according to control by the marine vehicle. One or more solar panels may include a ballast control system arranged to store or expel water to change a depth of a portion of the solar panel assembly. The marine vehicle processor may determine a submersion time based on at least one of an input from the motion sensor, the light sensor, and the clock. The controller may include a motor arranged to position the solar panel assembly into at least one of the extended and retracted positions.

The solar panel assembly may include at least one linkage assembly adjacent to at least one solar panel. The linkage assembly may be configured to allow an adjacent solar panel to move in response to a body of water in contact with the solar panel. The linkage assembly may include a rigid element having an articulating member configured to enable a difference in pitch, yaw, or roll between adjacent solar panels. The linkage assembly may include one or more of a hinge, ball joint, pivot joint, Johnson joint, swivel joint, rotary coupling, or combination thereof. The linkage assembly may include a flexible element enabling a difference in pitch, yaw, or roll between adjacent solar panels. The linkage assembly may include a cable, wire, rope, chain, flexible metallic line, flexible metallic thread, flexible plastic line, flexible ceramic line, or combination thereof.

A universal charging station (UCS) may be included in a surface section or submerged section of a marine vehicle such as a buoy. In this way, a first marine vehicle (e.g., an AUV) can perform its missions and then interface with the UCS of a second marine vehicle (e.g., a power buoy) at its surface or underwater location to be recharged.

The UCS may include a charging connection having an electro-mechanical connector to facilitate transfer of electrical current to/from the UCS of the marine vehicle to the AUV and/or provide a communications connection between a processor of the marine vehicle and one or more processors within the AUV. Inductive charging may be utilized. Also, wireless communications may be used to exchange information, including control commands between the UCS and AUV. For example, a processor of the AUV may interface with one or more temperature sensors associated with one or more battery cells within the AUV. The AUV processor may receive temperature information from the one or more temperature sensors and, in response, send control information to the processor of the marine vehicle. The processor of the marine vehicle or UCS may include and/or operate as a controller of the UCS to regulate the voltage and/or current output of the UCS, and/or temperature surrounding the battery housing of the AUV, in response to receiving control commands from the AUV processor. Alternatively, the marine vehicle or UCS processor may receive temperature information directly from the AUV temperature sensors, or temperature information relayed by the AUV processor, process such temperature information to then determine an output voltage and/or current of the UCS, and/or temperature surrounding the battery housing of the AUV.

Other objects, features, and advantages of the present invention will become apparent upon examining the following detailed description, taken in conjunction with the attached drawings.

BRIEF DESCRIPTION OF THE DRAWINGS

The systems and methods described herein are set forth in the appended claims. However, for purpose of explanation, several illustrative aspects are set forth in the following figures.

DESCRIPTION

Figure 1:
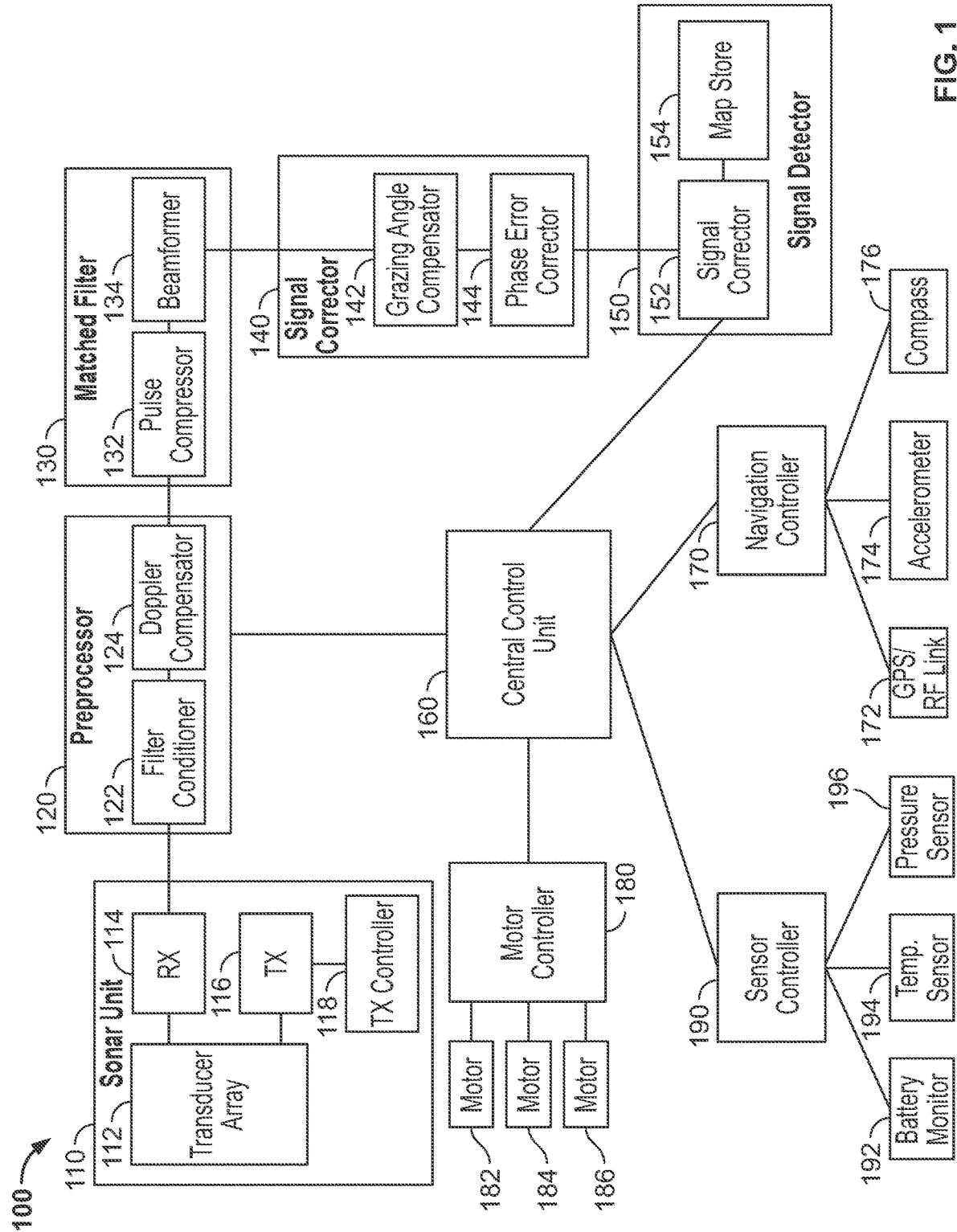
FIG. 1 is a block diagram of an exemplary remote vehicle system for implementing at least a portion of the systems and methods described in the present disclosure.

FIG. 1 is a block diagram depicting an illustrative remote vehicle, according to an illustrative aspect of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some aspects, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down).

The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain aspects, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain aspects, the peak of the envelope may be identified with high-precision, including down to the order of about 1/100th of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain aspects the transducer array 112 includes separate projectors and receivers. The transducer array 112 may be configured to operate in SAS mode (either stripmap or spotlight mode) or in a real aperture mode. In certain aspects, the transducer array 112 is configured to operate as a multibeam echo sounder, sidescan sonar or sectors can sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping. The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130. The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety. The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one aspect, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain aspects the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
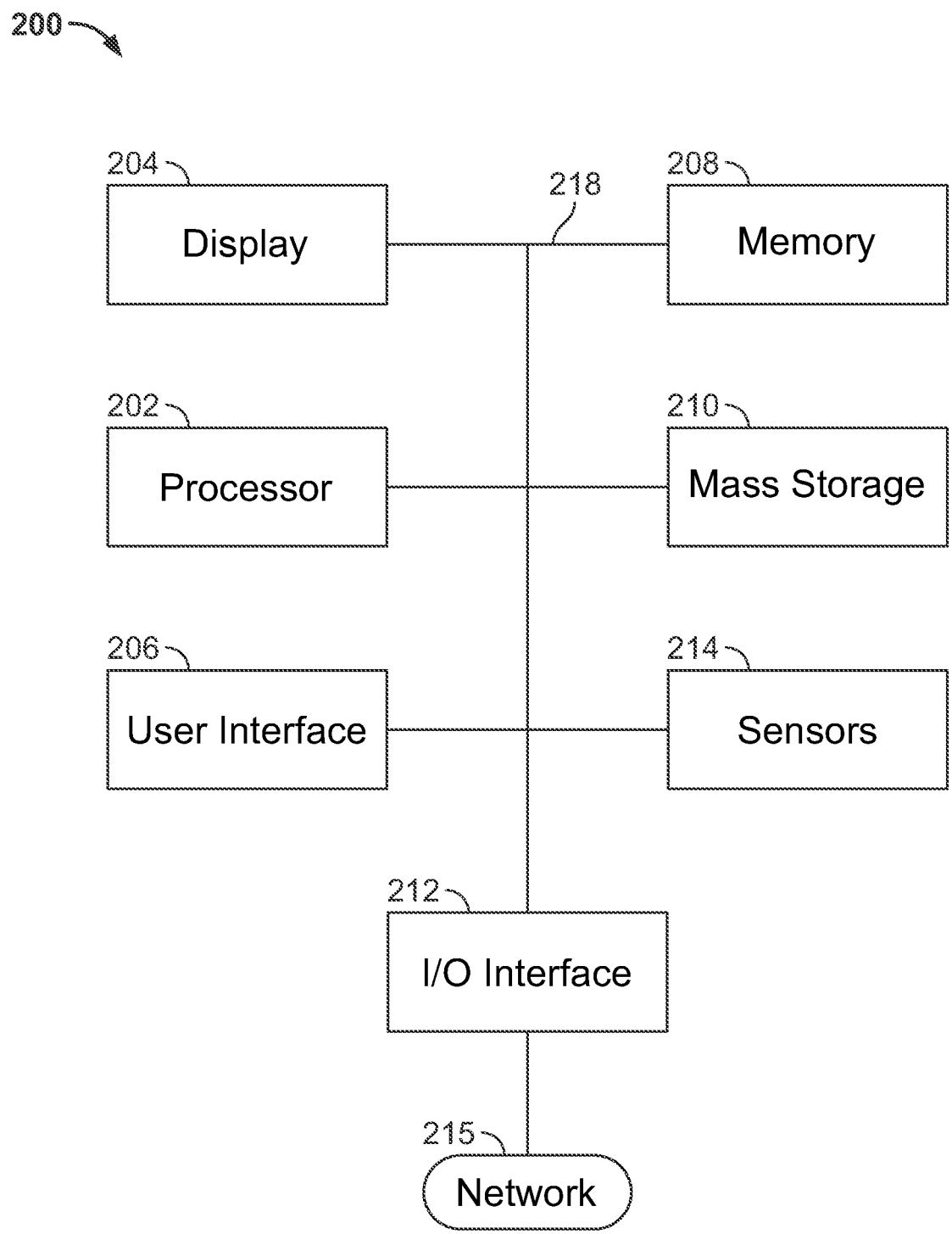
FIG. 2 is a block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a computer accessing a network according to an illustrative aspect of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some aspects, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some aspects, communications may occur over an acoustic modem. For instance, for AUVs, communications may occur over such a modem. Alternatively, the system 200 may include a mainframe or other type of host computer system capable of web-based communications via the network 216. In some aspects, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some aspects, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some aspects, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some aspects, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
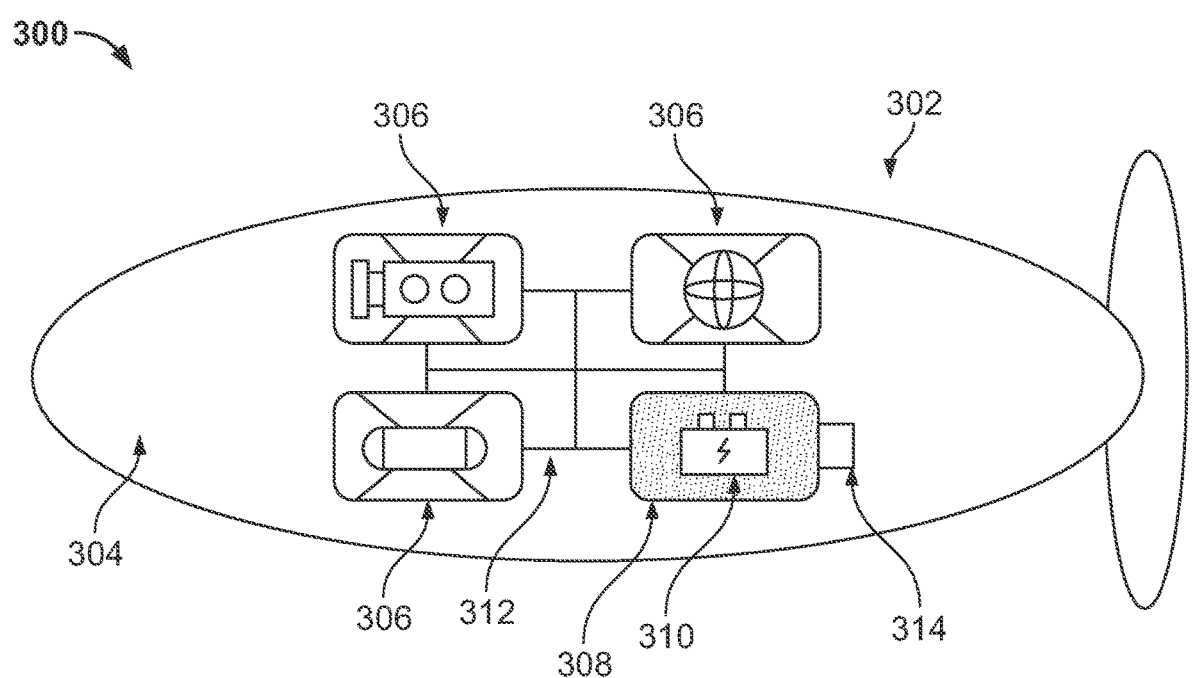
FIG. 3 is a block diagram depicting an exemplary remote vehicle, according to an illustrative aspect of the present disclosure.

FIG. 3 is a block diagram depicting an exemplary remote vehicle, according to an illustrative aspect of the present disclosure. Such an exemplary remote or autonomous vehicle includes a main body 302, along with a drive unit 304. For example, the drive unit 304 may be a propeller. The remote vehicle includes internal components, which may be located within different compartments within the main body 302. For example, the main body 302 may house a component 306. For example, the component 306 may be a sonar unit. Similarly, the main body 302 may house a pressure tolerant energy system 310, which may include a computer system, as described for example in FIG. 1 and FIG. 2. In addition, the remote or autonomous vehicle includes a power generating system 308. For example, the power generating system 308 may be a stack of battery elements, each comprising a stack of battery cells.

Large batteries use large arrays of cells. A series connection (with or without other parallel connections) may be required to meet specific power requirements. Any imbalance between cells may affect battery performance. If charging cells in series, charging is only desirable until one of the cells reaches its maximum cell voltage—proceeding with charging beyond that point would result in cell damage and/or may cause fire or explosion through the battery.

A vehicle, for example an underwater vehicle, may be powered by an array of battery packs, each battery pack comprising battery cells. These battery cells may comprise any suitable battery for providing energy to a vehicle, including, but not limited to, any suitable battery chemistry, a lithium battery, lithium-ion battery, lithium polymer battery, or a lithium sulfur battery. The battery cells may be in a matrix, or the battery cells may be arranged, aligned, or positioned in any suitable arrangement. In some aspects, the battery cells may be stacked on top of each other. In such aspects, the battery cells may include a separator between each vertically-stacked cell. The one or more battery cells may be positioned on a tray, wherein the tray provides structural support, alignment, and electrical insulation for the one or more battery cells. A backplane may connect the battery cells to management circuitry, described in further detail below. In alternate aspects, battery cells may be directly connected to the management circuitry. In some aspects, the battery cells may be connected to management circuitry through a communication network. A communication network may be any suitable network for communicating control signals. The management circuitry may comprise a pressure tolerant circuit board that may be manually programmed using any suitable programming language. In some aspects, a temperature sensor may be connected to the battery cells, either directly or through backplane. The battery cells may be configured to communicate cell health information, including at least a voltage and temperature, to the management circuitry. The management circuitry may include a water-intrusion detection circuit board, which may comprise a conductive trace that drops in resistance in the presence of water.

The primary factors that affect mission duration and sensor payload capability of an autonomous vehicle include the performance of the battery modules, including their ability to charge and discharge. Equally important for certain cell chemistries (e.g., Lithium Ion) is circuitry used in the management of the battery components. A battery manager (BMGR) may be configured to interface with the outside world and to protect the battery (by disconnecting the charge input and/or discharge output) if voltage or temperature safety limits are exceeded. The BMGR may shut down the battery immediately if it detects any individual cell voltage above the max cell voltage, or if any individual cell temperature exceeds a manufacturer recommended maximum temperature. The BMGR may disable charging of the battery system if any cell temperature is below a manufacturer recommended minimum temperature. The BMGR may disable discharging of the battery system if any cell temperature is below a manufacturer recommended minimum temperature for discharge, which may differ from the charge limit temperature. An over-discharge protection feature may be activated at any time, which will also shut down the battery if any individual cell voltage drops below a manufacturer recommended minimum cell voltage. To prevent an overcurrent condition, the battery system may be equipped with a pressure tolerant fuse in series with the positive terminal, and the BMGR may provide a controllable dual disconnect (high and low side switches). Further details regarding an exemplary pressure tolerant fuse are provided in U.S. Patent Application Publication No. 2012/0281503, the entire contents of which are incorporated herein by reference. This provides a safety feature by requiring two concurrent failures to happen before an uncommanded output voltage can be presented at the battery output.

Figure 4:
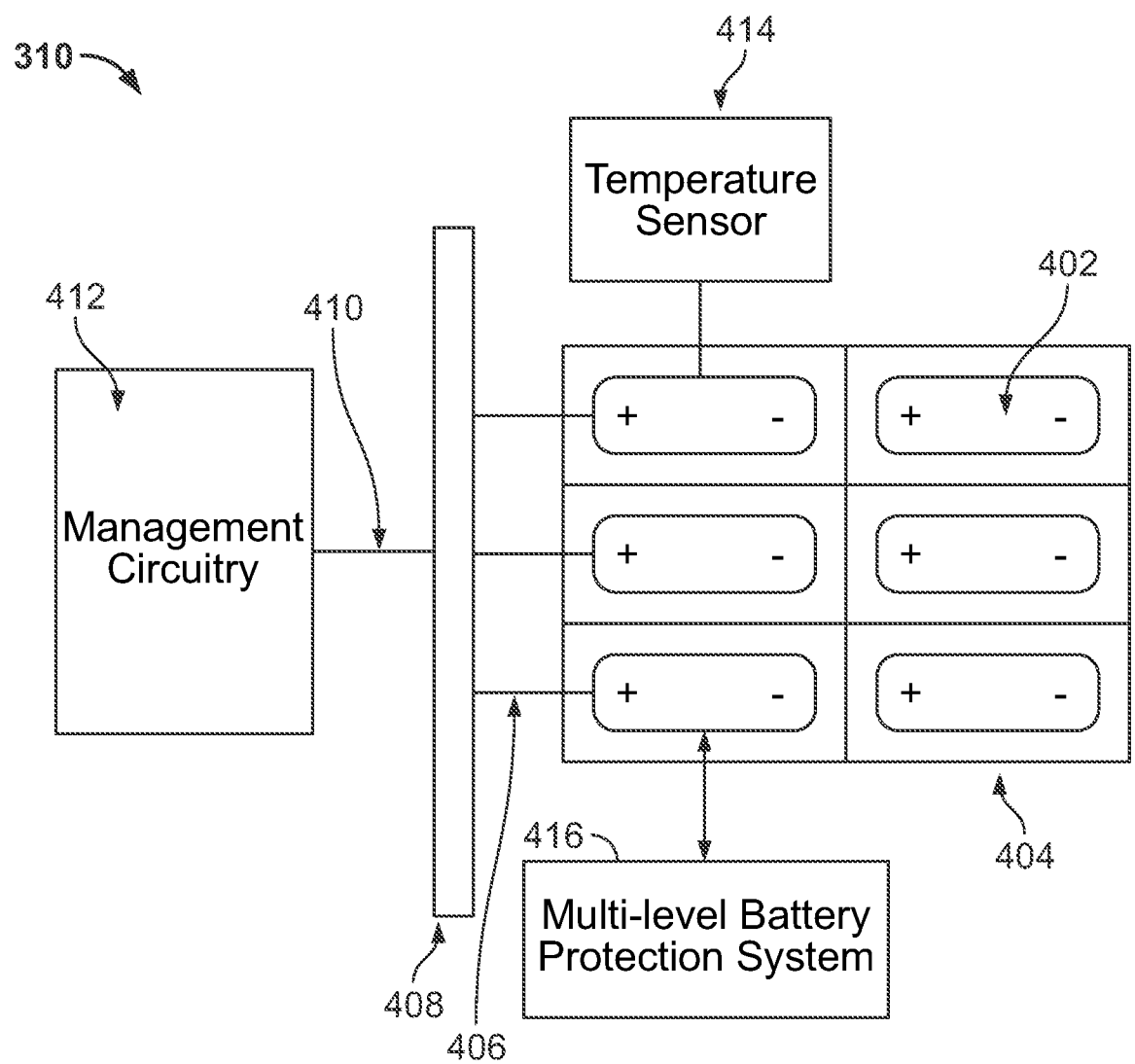
FIG. 4 is a block diagram depicting an illustrative example of a pressure tolerant energy system, according to an illustrative aspect of the present disclosure.

FIG. 4 is a block diagram depicting an illustrative example of a pressure tolerant energy system, such as the pressure tolerant energy system 310 depicted in FIG. 3. The pressure tolerant energy system 310 may comprise one or more battery cells 402, tray 404, electrical connections 406, backplane 408, communication network 410, management circuitry 412, a temperature sensor 414, and a multi-level battery protection system 416.

The battery cells 402 may comprise any suitable battery for providing energy to an underwater vehicle, including, but not limited to, a lithium battery, lithium-ion battery, lithium polymer battery, or a lithium sulfur battery. In some aspects, the battery cells 402 may be neutrally buoyant (e.g., compared to fresh water or sea/ocean water). Although the battery cells 402 are depicted in FIG. 4 in a 3×2 matrix, the battery cells 402 may be arranged, aligned, or positioned in any suitable arrangement. In some aspects, the battery cells 402 may be stacked on top of each other. In such aspects, the battery cells 402 may include a separator between each vertically-stacked cell.

The battery cells 402 may be placed into tray 404. The tray 404 may be made from any suitable material, such as thermoformed plastic. The tray 404 may provide structural support, alignment, and electrical insulation for the battery cells 402.

The battery cells 402 may be electrically and/or structurally connected to backplane 408. The backplane may provide both structural support and alignment for the battery cells 402. The backplane may also connect to an energy distribution system, such as energy distribution system 312 depicted in FIG. 3. In alternate aspects, the battery cells 402 may be connected directly to an energy distribution system.

The backplane may connect the battery cells 402 to the management circuitry 412. In alternate aspects, battery cells 402 may be directly connected to the management circuitry 412. In some aspects, the battery cells 402 may be connected to management circuitry 412 through communication network 410. Communication network 410 may be any suitable network for communicating control signals. The management circuitry 412 may comprise a pressure tolerant circuit board that may be manually programmed using any suitable programming language. In some aspects, a temperature sensor may be connected to the battery cells 402, either directly or through backplane 408. The battery cells 402 may be configured to communicate cell health information, including at least a voltage and temperature, to the management circuitry 412. The management circuitry 412 may include a water-intrusion detection circuit board, which may comprise a conductive trace that drops in resistance in the presence of water. The battery cells 402 may be connected to the multi-level battery protection system 416.

Figure 5:
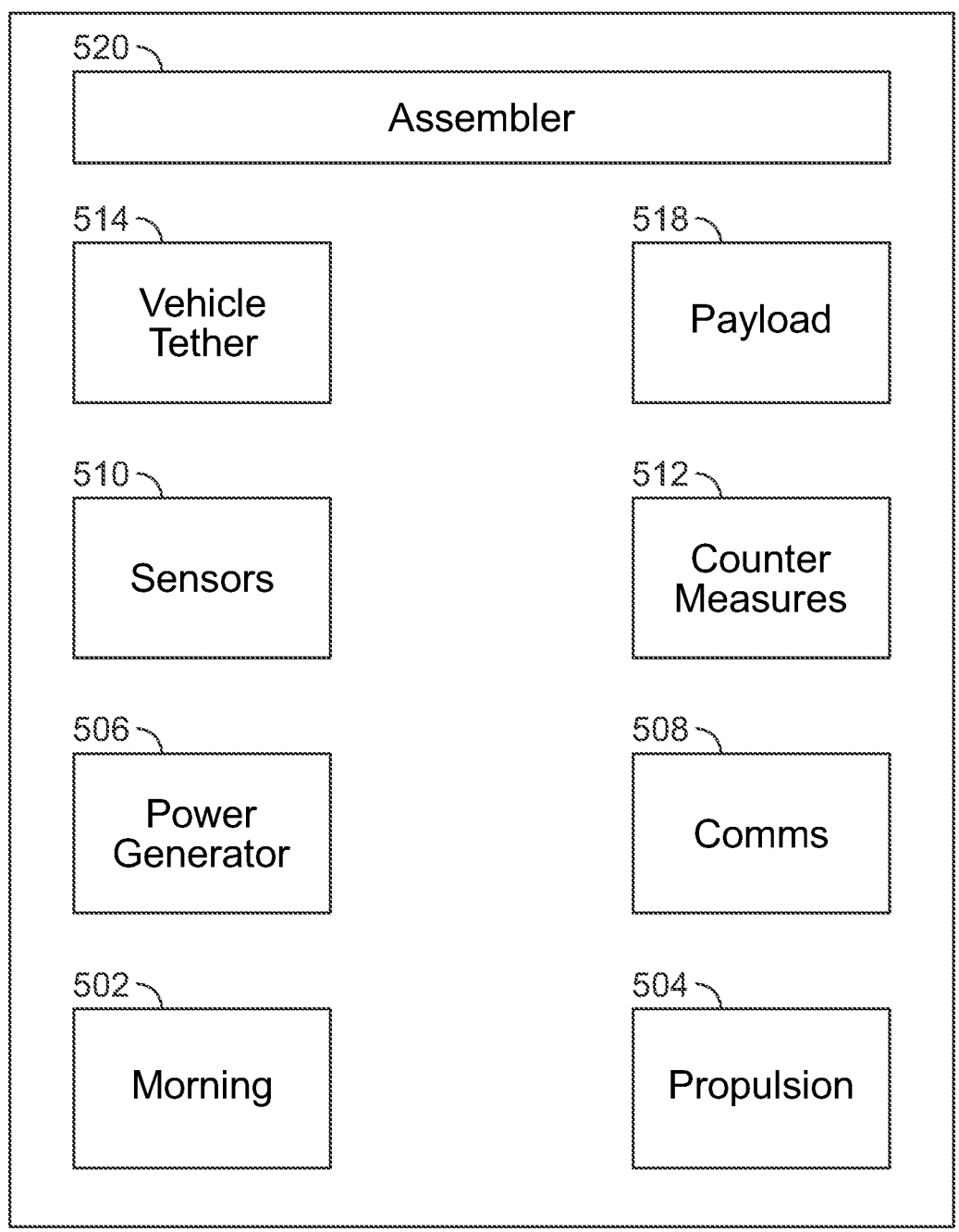
FIG. 5 is block diagram of exemplary functional elements of a buoy for implementing at least a portion of the systems and methods described in the present disclosure.

FIG. 5 is block diagram 500 of exemplary functional elements 502-518 of a buoy 600 for implementing at least a portion of the systems and methods described in the present disclosure. The buoy 600 may include a mooring system 502 configured to enable mooring of the buoy to the sea floor 512 via a tethering line 508 and mooring element 506. The buoy 600 may include propulsion element or system 504 configured to navigate the buoy. The propulsion system 504 may at least provide sufficient propulsion to counteract a current within the ocean. The propulsion system 504 may operate in response to a processor, GPS, and/or inertial navigation system to maintain the buoy in designated location. The buoy may include a power generator 506. The power generator 506 may include a solar panel, wind turbine, motion-based power generator, energy storage (one or more batteries, one or more fuel cells, liquid fuel), chemical reactor, and/or nuclear reactor, and so on. The power generator may include a charge and/or discharge controller (processor) to control energy storage and charging of, for example, batteries or to control discharge of the batteries during charging of another device such as a UAV 614.

The buoy may include a communications system 508 to enable the buoy to send and receive data to one or more other buoys, ships, vehicles, underwater vehicles, servers, satellites, and/or land-based networks. The exemplary system 500 may includes a processor, a memory, and an interconnect bus. The processor may include a single microprocessor or a plurality of microprocessors for configuring computer system as a multi-processor system. The memory illustratively includes a main memory and a read-only memory. The system 200 may also include the mass storage device having, for example, various disk drives, tape drives, etc. The main memory also includes dynamic random access memory (DRAM) and high-speed cache memory. In operation and use, the main memory stores at least portions of instructions for execution by the processor when processing data (e.g., model of the terrain) stored in main memory.

In some aspects, the system 500 may also include one or more input/output interfaces for communications, shown by way of example, as an interface for data communications via data communications system 508. The data interface may be a modem, an Ethernet card or any other suitable data communications device. The data interface may provide a relatively high-speed link to a network, such as an intranet, internet, or the Internet, either directly or through another external interface. The communication link to the network may be, for example, any suitable link such as an optical, acoustic, and/or wireless (e.g., via satellite, Microwave, or 802.11 Wi-Fi or cellular network) link. In some aspects, communications may occur over an acoustic modem. For instance, for communication with AUVs or other underwater vehicles, communications may occur over such a modem. Alternatively, the system 500 may include a mainframe or other type of host computer system capable of web-based communications via the network. In some aspects, the system 500 also includes suitable input/output ports via system 508 or may use an Interconnect Bus for interconnection with a local display and user interface (e.g., keyboard, mouse, touchscreen) or the like serving as a local user interface for programming and/or data entry, retrieval, or manipulation purposes. Alternatively, server operations personnel remotely may interact with the system 500 for controlling and/or programming the system from remote operations (not shown in the Figure) via the network.

In some aspects, the system 500 includes a processor, such as a navigational controller, sonar controller, radar control, data collection controller, and/or fire controller. Data corresponding to sensors may be stored in the memory or mass storage, and may be retrieved by the processor. The processor may execute instructions stored in these memory devices to perform any of the methods described in this application, e.g., data analysis, fire control, salinity analysis, wave monitoring, and so on.

The system may include a display for displaying information, a memory (e.g., ROM, RAM, flash, etc.) for storing at least a portion of the aforementioned data, and a mass storage device (e.g., solid-state drive) for storing at least a portion of the aforementioned data. Any set of the aforementioned components may be coupled to a network via an input/output (I/O) interface. Each of the aforementioned components may communicate via an interconnect bus.

The system 500 may include one or more sensors 510 configured to perform any number of operations. For instance sensors 510 may include active and/or passive radar, active and/or passive sonar, optical sensors, radio signal antenna and/or interceptors, chemical sensors (detect water composition), environment sensors, atmospheric sensors, inertial sensors, heat sensors, motion sensors, radiation sensors, and so on. The system 500 may include a countermeasures system 512. The countermeasures system 512 may be configured to provide anti-personnel, anti-ship, anti-submarine, and anti-aircraft functions. The countermeasures system 512 may include a processor (as discussed above) arranged to control a fire arm to protect the buoy from interference by a diver or other persons. The system 512 may utilize one of more sensors to detect the presence of persons within proximity to the buoy and, in response, engage the firearm and/or fire control system if necessary. The system 512 may include a fire control function to deploy a torpedo or rocket against a detected threat such as a surface or underwater vessel. The system 512 may deploy a rocket, laser, or other projectile against an aerial vehicle detected as a threat. The system 512 may provide detection information to system 508 to enable the buoy to communication a warning of a detected threat as a possible early warning system. The system 512 may include a vehicle tether system to enable the buoy to tether with another vehicle such as a boat, ship, AUV, and/or UAV. For example, the platform 504 is a type of tethering feature by enabling an UAV to land on the buoy. The platform 104 may include an electrical/mechanical connection to hold a UAV in place after landing, which may be advantageous in rough seas. An UAV may exchange data with a buoy via a wireless data connection such as 802.11 or Bluetooth once in proximity with the buoy. A UAV may utilize other types of wireless and/or RF communications to communicate with a buoy.

The system 500 may include payload storage 518. The payload storage 518 may store items such as modules for other buoys, items for delivery to other destinations, test equipment for deployment by the buoy, or ordinance (explosives). In some implementations, the buoy may function as an anti-ship or anti-submarine mine in which case the payload storage 518 may storage an explosive charge. The buoy may be configured to submerge to a designated depth to perform certain tests or to function as an anti-ship or anti-submarine mine. The buoy may be configured to surface in response to a received instruction or periodically.

In some implementations, the system 500 includes an assembler 520. The assembler 520 may be a distributed assembler enabling sections, modules, or components of the system 500 (e.g., buoy) to self-assemble into buoy 501. The assembler 520 may include a robot configured to connect various sections of buoy.

Figure 6:
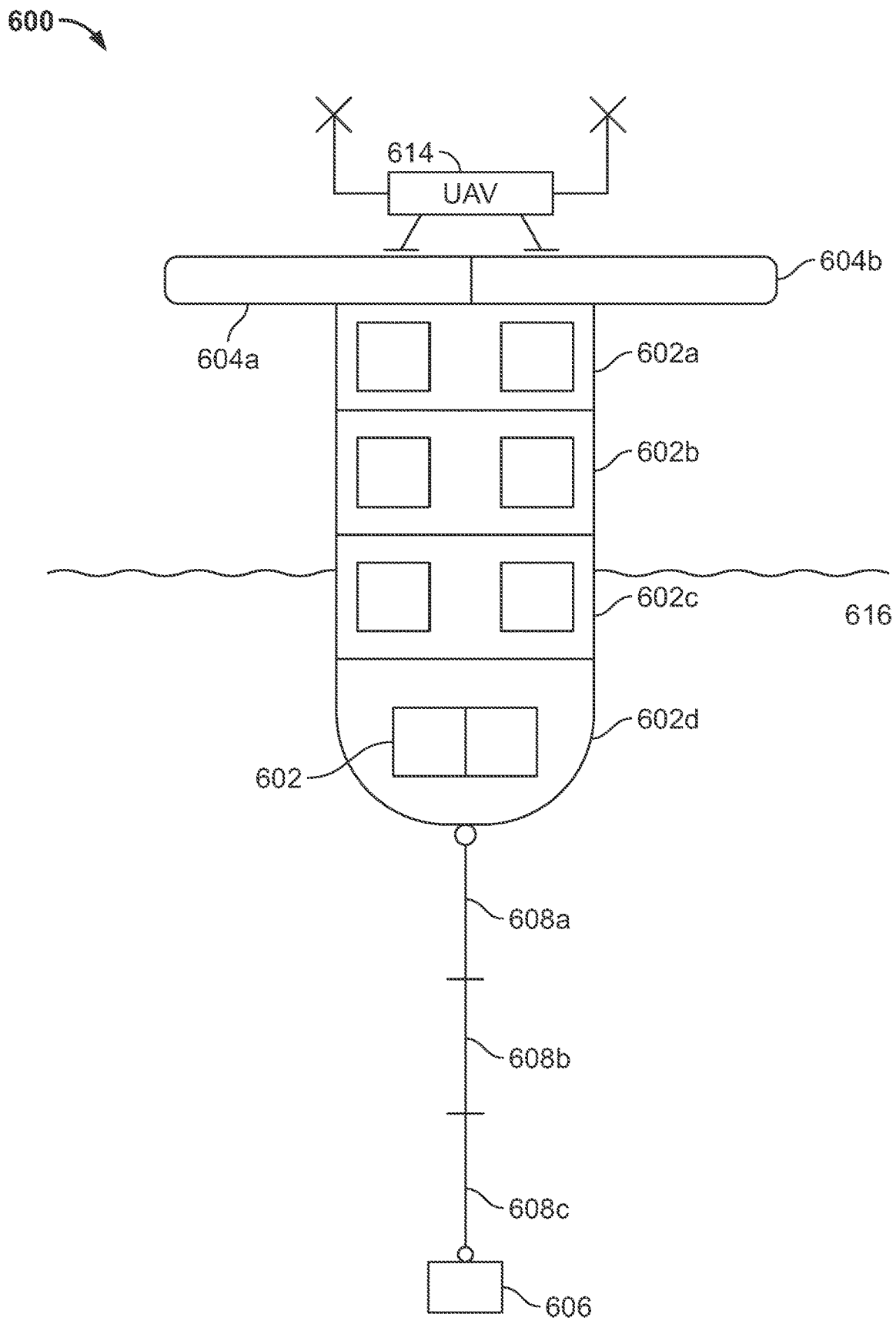
FIG. 6 depicts a modular or sectional buoy according to aspect of the present disclosure.

FIG. 6 depicts a modular or sectional buoy 600 according to aspect of the present disclosure. Each module may be delivered incrementally to a destination and sequentially assembled. For example, a base element of housing 602 (e.g. 602*d* of FIG. 6) may be delivered first by a first UAV 614. Then, a second portion of housing 602*c* may be delivered to the destination. In one configuration, housing module 602*d* includes a sensor (proximity and/or contact) that detects the presence of module 602*c*. The housing module 602*d* may include an assembler 520, connected to the housing module 602*d* that engages the module 602*c* with the module 602*d*. Module 602*c* may, in turn, include an assembler 520 engagement mechanism that engages module 602*b* with module 602*c* when detected. The process continues until all modules and/or sections of buoy 600 are assembled. In the illustrative embodiment shown in FIG. 6, modular or sectional buoy 600 is suspended in body of water 616.

Alternatively, assembler 520 may be included as part of an assembler vehicle. The assembler vehicle may be deployed to a destination location. Once at the location, one or UAVs 114 delivery the modules for buoy 600. The assembler may include a platform or storage container to protect the modules during assembly of the buoy 600. This approach may be advantageous in rough seas. Once assembly is complete, the assembler vehicle launches the buoy at the destination and then moves to the next destination location. Another advantage of this technique is that the assembler vehicle saved power (and can be deployed longer) because it is required to transport buoy components to destinations. In addition to housing components, one or more UAVs may delivery modules 602 including functional elements 502-520. A tethering line 608 may also be delivered in sections 608a, 608b, and 608c, and be assembled by an assembler 520 and/or one more UAVs 114.

Figure 7:
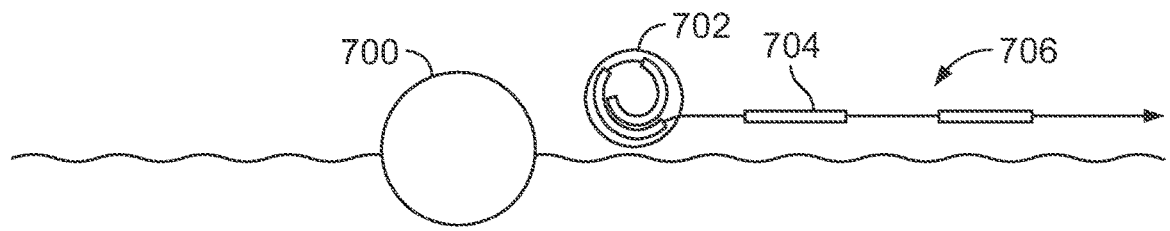
FIG. 7 shows a head on view of an exemplary marine vehicle including a solar panel assembly with flexibly rollable solar panels and external solar panel assembly housing.

FIG. 7 shows a head-on or frontal view of an exemplary marine vehicle 700 including a solar panel assembly 706 with flexibly rollable solar panels 704 and external solar panel assembly housing 702. In some implementations, the solar panel assembly is rolled into the housing 702 for storage in a retracted position and rolled out of the housing 702 to extend the solar panel assembly to a fully extended position. FIG. 7 illustrates an instance where the solar panel assembly 706 is partially extended with some solar panels rolled within the housing 702 while some solar panels 704 have been extended from the housing and lie substantially horizontally along the surface of a water body. The solar panel assembly is configured to be in the extended position for a first period of time. The first period of time includes a period when sufficient daylight is available for the solar panel assembly to generate electrical power.

Figure 8:
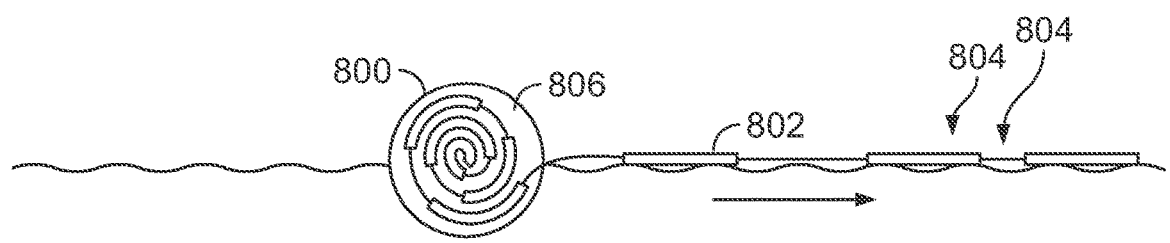
FIG. 8 shows a head on view of an exemplary marine vehicle including a solar panel assembly housing integrated with the marine vehicle housing.

FIG. 8 shows a head-on view of an exemplary marine vehicle 800 including a solar panel assembly housing integrated with the marine vehicle housing 806. FIG. 8 illustrates an instance where the solar panel assembly 804 is partially extended with some solar panels 804 rolled within the housing 806 while some solar panels 802 have been extended from the housing 806 and lie substantially horizontally along the surface of a water body.

Figure 9:
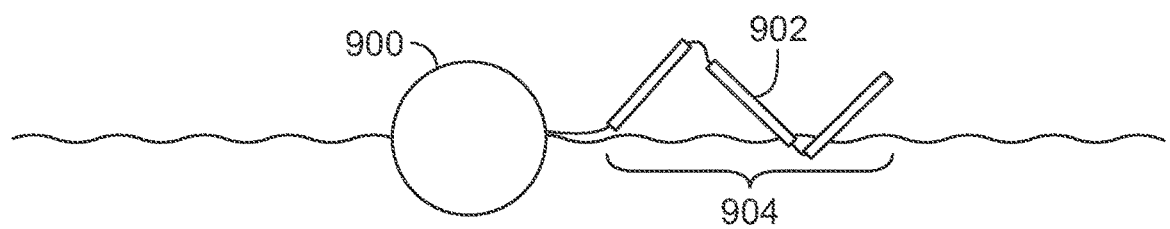
FIG. 9 shows a head on view of an exemplary marine vehicle including a foldable solar panel assembly.

FIG. 9 shows a head-on view of an exemplary marine vehicle 900 including a foldable solar panel assembly 904. In this implementation, the solar panels 902 may be stacked side-by-side when the solar panel assembly is in the fully retracted position, but then lies substantially horizontally along the surface of a water body when in a fully extended position. FIG. 9 illustrates an instance where the solar panel assembly is in an intermediate position between fully extended and fully retracted positions.

Figure 10:
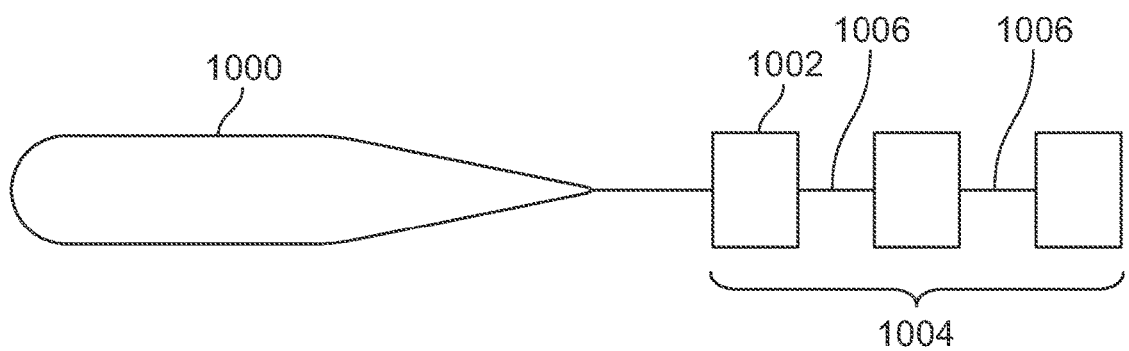
FIG. 10 shows a top down or overhead view an exemplary marine vehicle using a towed array solar panel assembly including multiple solar panels and linkage assemblies.

FIG. 10 shows a top-down or overhead view an exemplary marine vehicle 1000 using a towed array solar panel assembly 1004 including multiple solar panels 1002 and linkage assemblies 1006. In one implementation, the solar panel assembly 1004 may be deployed from a housing of the vehicle 1000 as the vehicle moves forward, allowing each solar panel 1002 incrementally be extended away from the vehicle 1000 by the dray of the ocean. The solar panel assembly 1004 and/or array follows the vehicle 1000 as it moves. The solar panel assembly 1004 may be retracted via a controller including a motor that pulls the linkage assembly (e.g., a cable) into a housing of the vehicle 1000.

Figure 11:
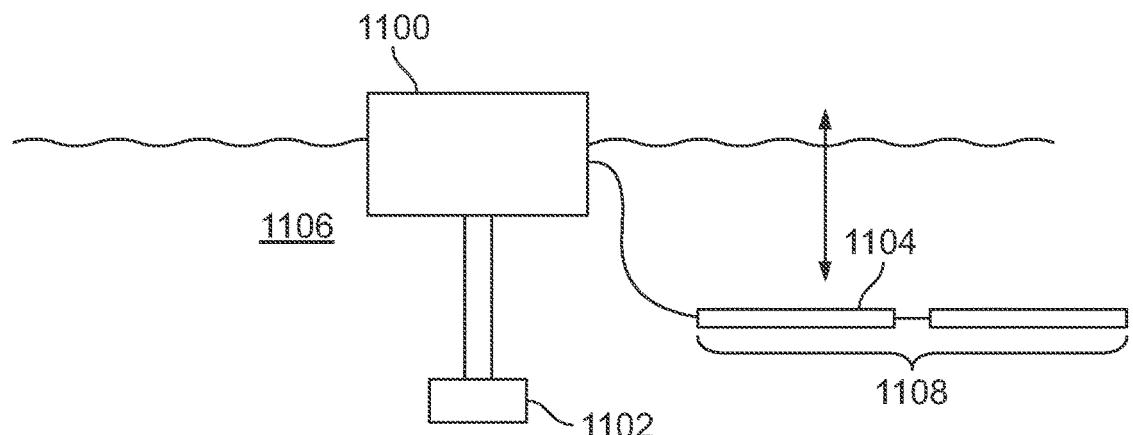
FIG. 11 shows a side view of an exemplary buoy including a submersible solar panel assembly and an underwater charging station.

FIG. 11 shows a side view of an exemplary buoy 1100 including a submersible solar panel assembly 1108 and an underwater charging station 1102 arranged to charge other marine vehicles (e.g., AUVs). The buoy may include a surface charging station. The solar panel assembly 1108 may include multiple solar panels 1104. The buoy 1100 may include a processor that controls the depth of the solar panel assembly based on various conditions and/or time. One or more of the solar panels 1104 may include a ballast system in communication with the processor to enable the process to control the amount of ballast and, thereby, the depth of a portion of the solar panel assembly 1104. Portions of the solar panel assembly, including the solar panels 1104, will include a waterproof and/or pressure tolerant housing to protect electronic components from shorting, corrosion, or other water damage.

Figure 12:
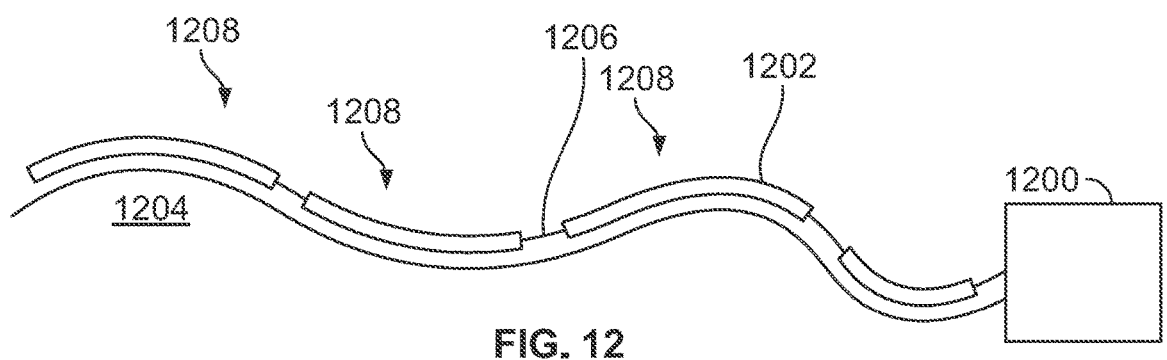
FIG. 12 shows a side view of an exemplary marine vehicle including a solar panel assembly having flexible solar panels mechanically connected via linkage assemblies.

FIG. 12 shows a side view of an exemplary marine vehicle 1200 including a solar panel assembly 1208 having flexible solar panels 1202 mechanically connected via linkage assemblies 1206. Due to the flexible characteristic of solar panels 1202, the length of a linkage assembly 1206 may be relatively short because the solar panel assembly 1208 would more readily conform to and/or react to wave or irregularities in the ocean surface. The length of a linkage assembly may be equal to or less than about $1/100$, $1/50$, $1/20$, $1/10$, $1/5$, $1/4$, $1/2$, same, 2, 4, 10, 20 100 times the length of an adjacent solar panel.

Figure 13:
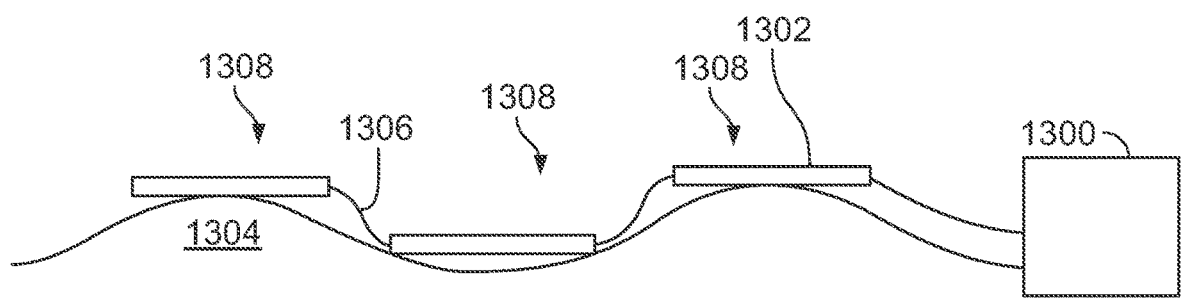
FIG. 13 shows a side view of an exemplary marine vehicle including a solar panel assembly having rigid solar panels mechanically connected via linkage assemblies.

FIG. 13 shows a side view of an exemplary marine vehicle 1300 including a solar panel assembly 1308 having rigid solar panels 1302 mechanically connected via linkage assemblies 1306. Due to the rigid characteristic of solar panels 1302, the length of a linkage assembly 1306 may be configured so that the solar panel assembly 1308 would more readily conform to and/or react to wave or irregularities in the ocean surface. The length of a linkage assembly may be equal to or less than about $1/100$, $1/50$, $1/20$, $1/10$, $1/5$, $1/4$, $1/2$, same, 2, 4, 10, 20 100 times the length of an adjacent solar panel.

Figure 14:
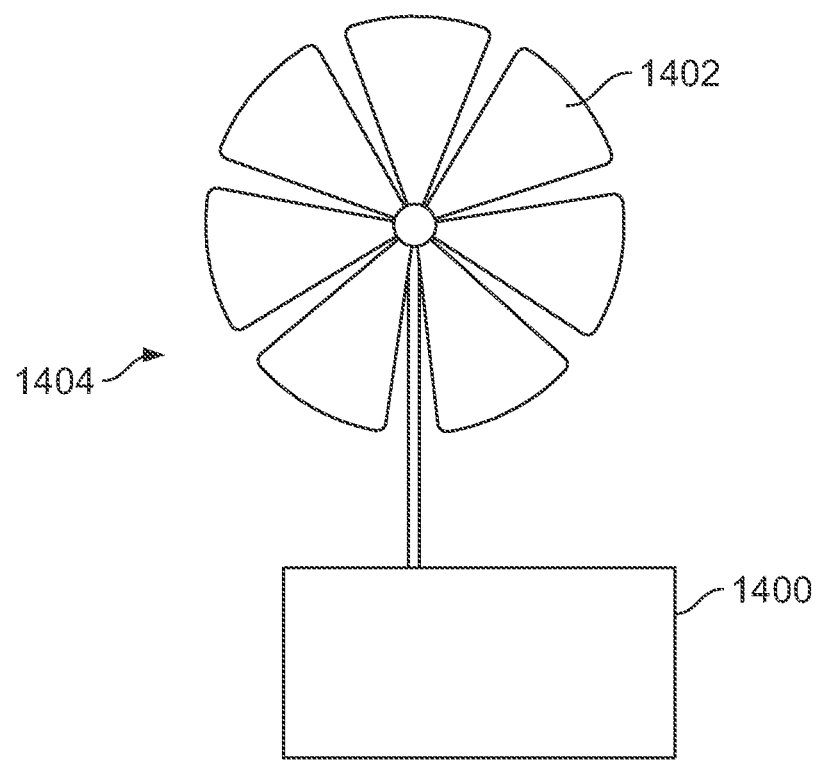
FIG. 14 shows an exemplary marine vehicle including a flower-shaped and/or circular solar panel array.

FIG. 14 shows an exemplary marine vehicle 1400 including a flower-shaped and/or circular solar panel assembly and/or array 1404 including multiple solar panels 1402. Solar panels may include various shapes and sizes. Shapes may include rectangular, square, circular, pie-shaped, triangular, cylindrical, and so on. A solar panel assembly may include solar panels arranged in various two-dimensional array formations including, for example, one or more rows, one or more columns, and one or more array shapes.

Figure 15:
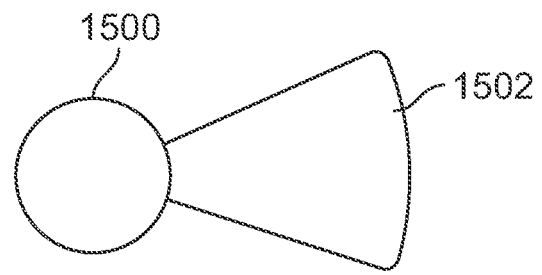
FIG. 15 shows top down view of an exemplary marine vehicle where the solar panel assembly is in a retracted configuration.

FIG. 15 shows top down view of an exemplary marine vehicle 1500 where the solar panel assembly 1502 is in a retracted configuration. The solar panel assembly is further configured to be in the retracted position for the second period of time. The second period of time includes a period when there is insufficient daylight available for the solar panel.

Figure 16:
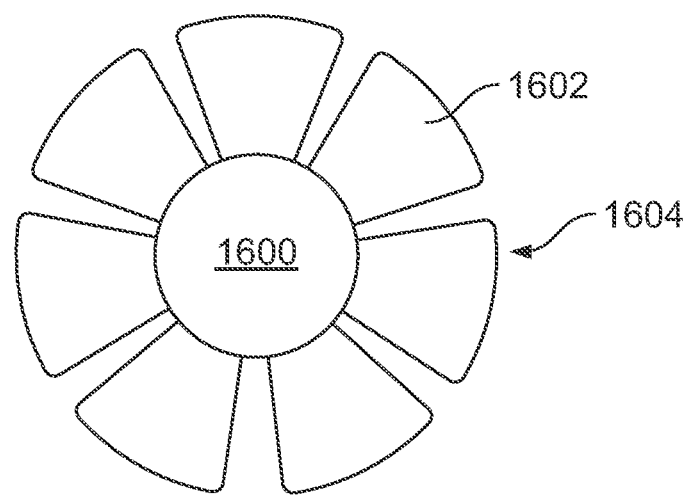
FIG. 16 shows a top down view of the exemplary marine vehicle of FIG. 15 where the solar panels assembly is in a fully extended configuration.

FIG. 16 shows a top down view of the exemplary marine vehicle 1600 where the solar panels assembly 1604 is in a fully extended configuration where multiple solar panels 1602 are arranged in a flower-like configuration.

Solar panels, also referred to as photovoltaic solar panels, absorb sunlight as a source of energy to generate electricity. A photovoltaic (PV) module is a packaged, connected assembly of typically 6×10 photovoltaic solar cells. In some configurations, photovoltaic modules form the photovoltaic array of a photovoltaic system that generates and supplies solar electricity in commercial and residential applications.

In certain implementations, each module is rated by its direct current (DC) output power under standard test conditions (STC), and typically ranges from 100 to 365 Watts (W). The efficiency of a module may determine the area of a module given the same rated output, i.e., an 8% efficient 220 W module will typically have twice the area of a 16% efficient 220 W module. Existing commercially available solar modules typically do not exceed efficiency of 24%.

In certain implementations, as solar panel may include multiple solar modules. As a single solar module can produce only a limited amount of power, a solar panel will contain multiple solar modules. In certain configurations, a solar panel assembly may include a photovoltaic system with multiple solar panels, each having an array of photovoltaic modules, an inverter. The marine vehicle and/or its solar panel assembly may include one or more batteries for electrical power storage, interconnection wiring for elements of the solar panel assembly and/or vehicle power system, and optionally a solar tracking mechanism. In some implementations, the vehicle processor and/or solar panel assembly controller is configured to adjust the orientation of one or more solar panels in response to tracking data from the solar tracking mechanism.

Photovoltaic modules use light energy (photons) from the Sun to generate electricity through the photovoltaic effect. Most existing modules use wafer-based crystalline silicon cells or thin-film cells. The structural (load carrying) member of a module can either be the top layer or the back layer. Cells may also be protected from mechanical damage and moisture. In some implementations, modules are rigid, but in other implementations semi-flexible ones based on thin-film cells are used. In certain configurations, cells are connected electrically in series, one to another.

A PV junction box may be attached to the back of a solar panel and function as the panel's electrical output interface. In some implementations, externally, most of the photovoltaic modules will use MC4 or like connector types to facilitate weatherproof connections to the rest of a vehicle power system. In some implementations, a USB power interface may be used. Module electrical connections may be made in series to achieve a desired output voltage or in parallel to provide a desired current capability (amperes). The conducting wires that take the current off the modules may contain silver, copper or other non-magnetic conductive transition metals. Bypass diodes may be incorporated or used externally, in case of partial module shading, to maximize the output of module sections still illuminated.

In some implementations, solar PV modules include concentrators in which light is focused by lenses or mirrors onto smaller cells to, for example, enable the use of cells with a high cost per unit area (e.g., gallium arsenide) in a cost-effective way. Solar panels may also use metal, ceramic, and/or plastic frames consisting of racking components, brackets, reflector shapes, troughs to better support the panel structure, and the like. In some implementations, one or more solar panels include an under-housing and/or hull to facilitate buoyancy and/or allow the one or more solar panels to float on a body of water. In some configurations, the hull may include electronic circuitry supporting operations of the one or more solar panels. A ballast control system may also be included within the hull.

It will be apparent to those skilled in the art that such aspects are provided by way of example only. It should be understood that numerous variations, alternatives, changes, and substitutions may be employed by those skilled in the art in practicing the invention. Accordingly, it will be understood that the invention is not to be limited to the aspects disclosed herein, but is to be understood from the following claims, which are to be interpreted as broadly as allowed under the law.

The invention claimed is:

1. A marine vehicle comprising:
   a power system arranged to receive and store electrical power from a solar panel assembly, the power system including one or more batteries;
   a processor arranged to determine an extension time and a retraction time for a solar panel assembly;
   a controller, in response to instructions from the processor, arranged to extend the solar panel assembly and retract the solar panel assembly;
   the solar panel assembly arranged to be configured in at least one of an extended position and a retracted position, the solar panel assembly including one or more solar panels, the solar panel assembly being in electrical communication with the power system; and
   wherein the one or more solar panels are flexibly bendable, the one or more solar panels being rolled in the retracted position and the one or more solar panels being unrolled in the extended position.

2. The vehicle of claim 1 comprising solar assembly housing arranged to store the solar panel assembly while in the retracted position.

3. The vehicle of claim 2, wherein the solar assembly housing is at least one of integrated with a housing of the vehicle and included within the housing of the vehicle.

4. The vehicle of claim 1, wherein the vehicle includes one of an AUV, an autonomous surface ship or boat, a buoy, a marine platform, a marine oil rig, and a submarine.

5. A marine vehicle comprising:
   a power system arranged to receive and store electrical power from a solar panel assembly, the power system including one or more batteries;
   a processor arranged to determine an extension time and a retraction time for a solar panel assembly;
   a controller, in response to instructions from the processor, arranged to extend the solar panel assembly and retract the solar panel assembly;
   the solar panel assembly arranged to be configured in at least one of an extended position and a retracted position, the solar panel assembly including one or more solar panels, the solar panel assembly being in electrical communication with the power system;
   wherein the processor determines at least one of the retraction time, the extension time, and a submersion time based on at least one of an input from at least one of a motion sensor, a light sensor, and a clock; and
   wherein the processor extends or retracts the solar panel assembly based at least on one of i) comparing a time of the clock with a stored extension time or retraction time stored in a memory, ii) comparing a detected light level, via the light sensor, with a light level stored in the memory, and iii) comparing a detected amount of movement, via the motion sensor, with a movement limit stored in the memory.

6. The vehicle of claim 5, wherein the one or more solar panels are stacked in the retracted position and the one or more solar panels are substantially adjacent to each other in the extended position.

7. The vehicle of claim 5, wherein the motion sensor includes an accelerometer.

8. The vehicle of claim 5, wherein a portion of the solar panel assembly is submersible.

9. The vehicle of claim 8, wherein one or more solar panels include a ballast control system arranged to store or expel water to change a depth of a portion of the solar panel assembly.

10. The vehicle of claim 1, wherein the controller includes a motor arranged to position the solar panel assembly into at least one of the extended and retracted positions.

11. A marine vehicle comprising:
   a power system arranged to receive and store electrical power from a solar panel assembly, the power system including one or more batteries;
   a processor arranged to determine an extension time and a retraction time for a solar panel assembly;
   a controller, in response to instructions from the processor, arranged to extend the solar panel assembly and retract the solar panel assembly;

the solar panel assembly arranged to be configured in at least one of an extended position and a retracted position, the solar panel assembly including one or more solar panels, the solar panel assembly being in electrical communication with the power system; and wherein the solar panel assembly includes at least one linkage assembly adjacent to at least on solar panel, the linkage assembly configured to allow the adjacent solar panel to move in response to a body of water in contact with the solar panel.

12. The vehicle of claim 11, wherein the linkage assembly includes a rigid element having an articulating member configured to enable a difference in pitch, yaw, or roll between adjacent solar panels.

13. The vehicle of claim 12, wherein the linkage assembly includes one or more of a hinge, ball joint, pivot joint, Johnson joint, swivel joint, rotary coupling, or combination thereof.

14. The vehicle of claim 11, wherein the linkage assembly includes a flexible element enabling a difference in pitch, yaw, or roll between adjacent solar panels.

15. The vehicle of claim 14, wherein the linkage assembly includes a cable, wire, rope, chain, flexible metallic line, flexible metallic thread, flexible plastic line, flexible ceramic line, or combination thereof.

16. A method for generating electrical power for a marine vehicle comprising:

receiving electrical power from a solar panel assembly;

storing the electrical a power in one or more batteries;

determining, via a processor, an extension time and a retraction time for the solar panel assembly;

extending and retracting the solar panel assembly in response to instructions from the processor;

positioning the solar panel assembly in an extended position during a first period of time and in a retracted position during a second period of time; and flexibly bending one or more solar panels of the solar panel assembly such that the one or more solar panels are rolled in the retracted position and the one or more solar panels are unrolled in the extended position.

17. The method of claim 16, wherein the first period of time includes a period when sufficient daylight is available for the solar panel assembly to generate electrical power, and wherein the second period of time includes a period when there is insufficient daylight available for the solar panel.

* * * * *